United States Patent
Feltrin

(10) Patent No.: US 12,083,821 B2
(45) Date of Patent: Sep. 10, 2024

(54) BICYCLE WHEEL RIM AND PROCESS FOR MANUFACTURING THE SAME

(71) Applicant: CAMPAGNOLO S.r.l., Vicenza (IT)

(72) Inventor: Mauri Feltrin, Nanto (IT)

(73) Assignee: CAMPAGNOLO S.r.l., Vicenza (IT)

( * ) Notice: Subject to any disclaimer, the term of this patent is extended or adjusted under 35 U.S.C. 154(b) by 409 days.

(21) Appl. No.: 17/227,512

(22) Filed: Apr. 12, 2021

(65) Prior Publication Data

US 2021/0323347 A1   Oct. 21, 2021

(30) Foreign Application Priority Data

Apr. 16, 2020   (IT) .................. 102020000008116

(51) Int. Cl.
*B60B 21/06* (2006.01)
*B60B 1/04* (2006.01)
*B60B 5/02* (2006.01)

(52) U.S. Cl.
CPC ............ *B60B 21/064* (2013.01); *B60B 1/041* (2013.01); *B60B 1/043* (2013.01); *B60B 5/02* (2013.01); *B60B 21/062* (2013.01); *B60B 2310/204* (2013.01); *B60B 2310/226* (2013.01); *B60B 2360/341* (2013.01); *B60B 2900/311* (2013.01)

(58) Field of Classification Search
CPC ....... B60B 21/00; B60B 21/06; B60B 21/064; B60B 21/062; B60B 1/003; B60B 1/041; B60B 1/043; B60B 5/02; B60B 2310/204; B60B 2310/226; B60B 2360/341; B60B 2900/311; B60B 2200/13; B23D 79/00
See application file for complete search history.

(56) References Cited

U.S. PATENT DOCUMENTS

| 7,578,563 | B2 * | 8/2009 | Muraoka ................. B60B 1/041 |
| | | | 301/58 |
| 8,652,380 | B2 * | 2/2014 | Lew ....................... B29C 70/345 |
| | | | 156/193 |
| 10,315,461 | B2 * | 6/2019 | Schiers .................... B60B 1/043 |
| 2012/0006470 | A1 | 1/2012 | Lew et al. |
| 2022/0105751 | A1 | 4/2022 | Feltrin |

FOREIGN PATENT DOCUMENTS

| EP | 1328409 A1 | 7/2003 |
| EP | 2 422 959 A1 | 2/2012 |
| EP | 3 470 238 A1 | 4/2019 |

(Continued)

OTHER PUBLICATIONS

Italian Search Report and Written Opinion in Italian Application No. 102020000008116, Apr. 16, 2020 with English translation.

(Continued)

*Primary Examiner* — S. Joseph Morano
*Assistant Examiner* — Eva L Comino
(74) *Attorney, Agent, or Firm* — Steinfl + Bruno LLP

(57) ABSTRACT

A bicycle wheel rim, comprising a wall made of composite material having a plurality of perforated spoke-attachment seats, wherein each perforated seat is delimited by at least one first area comprising an amassment of continuous structural fibers and at least one second area circumferentially spaced apart from said first area and comprising cut structural fibers. A process for manufacturing the aforementioned rim is also disclosed.

13 Claims, 7 Drawing Sheets

(56) References Cited

FOREIGN PATENT DOCUMENTS

EP            3495158 A1 *  6/2019  ............. B29C 70/34
WO     WO-2011095399 A1 *  8/2011  ................ B26F 1/24

OTHER PUBLICATIONS

European Communication pursuant to Article 94(3) EPC for European Application No. 21165986.7 filed on Mar. 30, 2021 on behalf of Campagnolo S.R.L. Mail Date: May 31, 2023 6 pages.
Italian Search Report and Written Opinion in Italian Application No. 102020000023149, Jun. 24, 2021 with English translation.

* cited by examiner

BICYCLE WHEEL RIM AND PROCESS FOR MANUFACTURING THE SAME

CROSS REFERENCE TO RELATED APPLICATION

This application claims the benefit of Italian Application No. 102020000008116, filed on Apr. 16, 2020 which is incorporated herein by reference as if fully set forth.

FIELD OF INVENTION

The invention relates generally to a bicycle wheel rim. More particularly, the invention relates to molded bicycle wheel rim. Most particularly, the invention relates to a molded bicycle wheel rim made of composite materials and perforated to form spoke-attachment seats.

The invention also relates to a process for manufacturing the aforementioned rim.

BACKGROUND

Rims made of composite material are known and are usually manufactured through moulding of the composite material according to a variety of cross-sectional shapes.

Typically, in the case of composite material including thermosetting polymeric material a compression moulding is carried out, whereas in the case of composite material including thermoplastic polymeric material an injection moulding is carried out.

Before associating the rim with a hub to form a bicycle wheel, a plurality of perforated spoke-attachment seats must be made in the rim.

The aforementioned perforated seats must be made in the positions required by the spoke pattern of the particular wheel, namely depending on the number of spokes, their distribution along the circumference of the rim, their position in the cross section of the rim, and the direction taken up by each spoke, for example by virtue of the radial or tangential attachment of the spoke to the hub and/or the camber angle.

Patent application n° EP 2422959 to the Applicant and U.S. patent Ser. No. 10/315,461 disclose processes for manufacturing bicycle wheel rims made of composite material in which the plurality of perforated spoke-attachment seats is made before moulding the composite material, so that after moulding bicycle wheel rims are obtained already equipped with the aforementioned perforated seats. In particular, the perforated spoke-attachment seats are formed in the desired positions through a displacement of the structural fibers before moulding the composite material.

In EP 2422959 such a displacement is carried out by using a non-cutting pointed tool, like for example an awl. Such a tool, once inserted in the composite material, causes a localized displacement of the structural fibers, without cutting or shearing or removing structural fibers (except eventually for a very limited number of structural fibers, in particular those structural fibers which are located right at the tip end of the tool).

In U.S. Ser. No. 10/315,461 all of the structural fibers located at each of the perforated seats to be made are displaced (except eventually for the provision of a percentage of cut structural fibers equal, at most, to 10% of the total structural fibers arranged at each perforated seat).

In the solutions described in EP 2422959 and U.S. Ser. No. 10/315,461, the displacement of the structural fibers results, in the case of unidirectional fibers, in the presence of two areas comprising an amassment of continuous (i.e. uncut) structural fibers arranged at diametrically opposite areas with respect to the perforated seat and along a substantially transversal direction with respect to the longitudinal direction of the structural fibers. On the other hand, in the case of bi-directional fibers, the displacement of the weft structural fibers and warp structural fibers results in the presence of four areas comprising an amassment of continuous structural fibers at four areas spaced apart by about 90° around the perforated seat.

The Applicant has observed that a drawback of the prior art solutions is that, particularly in the case of unidirectional fibers but also in the case of bi-directional fibers, because of the displacement of such fibers areas in which there is only polymeric material are formed at opposite parts with respect to each perforated seat and spaced apart from the areas comprising an amassment of the fibers. Such areas define structurally weakened parts. In such areas it is also possible to have small parts devoid of polymeric material, i.e. parts with air bubbles, with consequent further weakening of the rim.

Another drawback is linked to the fact that around the perforated seats the structural fibers are not fully stretched and in order to be able to work correctly they must first stretch out and be loaded. This results in a structural weakening of the rim, or at least in a delay in the response provided by the rim to the mechanical stresses which it is subjected to during tensioning of the spokes and during pedaling.

The technical problem at the basis of the invention is to provide a rim made of composite material that can best and most readily withstand the aforementioned mechanical stresses.

SUMMARY

The present invention relates, in a first aspect thereof, to a bicycle wheel rim comprising a wall made of composite material having a plurality of perforated spoke-attachment seats, wherein each perforated seat is delimited by at least one first area comprising an amassment of continuous structural fibers and at least one second area circumferentially spaced apart from said first area and comprising cut structural fibers.

BRIEF DESCRIPTION OF THE DRAWINGS

Further characteristics and advantages of the invention will become clearer from the description of a preferred embodiment thereof, made with reference to the attached drawings, in which.

DETAILED DESCRIPTION OF THE PREFERRED EMBODIMENTS

Figure 1:
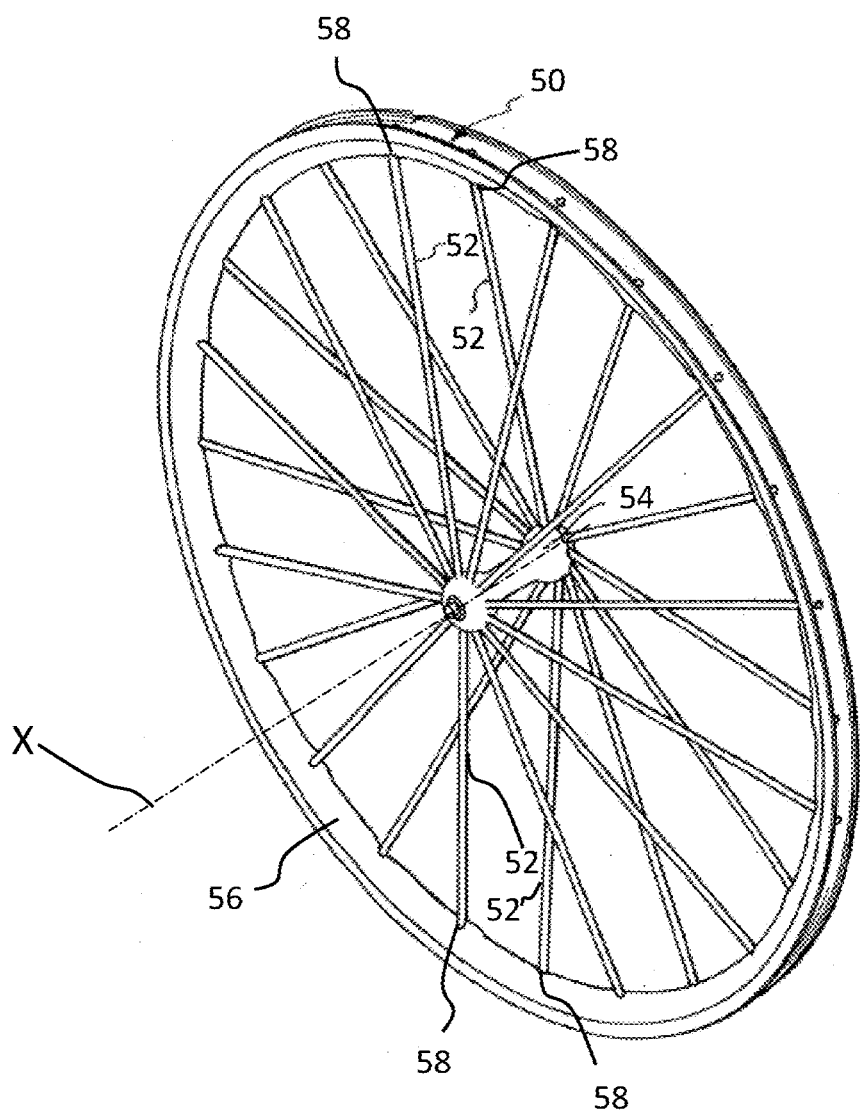
FIG. 1 schematically illustrates a perspective view of a bicycle wheel rim according to the present invention.

The rim of the invention comprises, at least on a wall thereof in which the perforated spoke-attachment seats are made, a composite material. Hereinafter, such a rim will also be identified with the expression "rim made of composite material".

In the present description and in the attached claims, the term "perforated spoke-attachment seat" is used in a broad sense, to include both a seat in which a spoke is directly inserted, for example a spoke provided with an enlarged head or with a threading, and a seat in which it is inserted a nipple or other element with which the spoke is associated.

In the present description and in the attached claims, the term "composite material" is used to indicate a material comprising a plurality of structural fibers incorporated in a polymeric material. Typically, the aforementioned structural fibers are unidirectional or bi-directional fibers. In the first case, a single layer of unidirectional fibers or at least two juxtaposed layers of unidirectional fibers inclined with respect to one another can be provided. In areas of the rim far from the perforated spoke-attachment seats the structural fibers of each layer extend substantially parallel to one another along a respective longitudinal direction. In the second case, the composite material defines a fabric comprising a first plurality of substantially parallel structural fibers extending along the aforementioned first longitudinal direction (weft fibers) and a second plurality of substantially parallel structural fibers extending along a second direction substantially perpendicular to the aforementioned first direction (warp fibers).

Hereinafter, when reference is made to unidirectional fibers the structural fibers of a layer of unidirectional fibers are referred to, whereas when reference is made to bi-directional fibers the structural fibers of a fabric of bi-directional fibers are referred to.

In the present description and in the attached claims, the term "area comprising an amassment of continuous structural fibers" is used to indicate an area in which the local density of the continuous structural fibers is greater than an average nominal density of the continuous structural fibers in the composite material. Therefore, if the composite material has a certain average nominal density of continuous structural fibers, it will have, in every area of the wall of the rim far from the perforated seats, a density of continuous structural fibers in a tolerance range around the average nominal density and, in the area comprising an amassment of continuous structural fibers, a density of continuous structural fibers greater than the upper extreme of such a tolerance range. The area comprising an amassment of continuous structural fibers is obtained while the perforated spoke-attachment seats are made before moulding the composite material, i.e. before the latter is cross-linked. In such circumstances, indeed, the continuous structural fibers are capable of moving with respect to the polymeric material because of the thrusting action exerted on them by the tool used to make the perforated spoke-attachment seats.

Advantageously, thanks to the presence of structural fibers in all of the areas around each perforated seat, the fibers have been displaced leaving only polymeric material, the rim of the invention is capable of responding to the mechanical stresses which it is subjected to during use more quickly and effectively with respect to the prior art rims. Moreover, once the composite material is cross-linked after moulding, at least some of the cut structural fibers that are incorporated in the polymeric material are properly stretched and are thus suitable for withstanding and effectively transferring the stresses which the rim is subjected to at the spoke-attachment seats.

Preferably, each perforated seat is delimited by at least two first areas comprising an amassment of continuous structural fibers and by at least two second areas circumferentially spaced apart from said at least two first areas and comprising cut structural fibers.

More preferably, in the case of unidirectional fibers two first areas comprising an amassment of continuous structural fibers and two second areas comprising cut structural fibers are provided, whereas in the case of bi-directional fibers four first areas comprising an amassment of continuous structural fibers and four second areas comprising cut structural fibers are provided.

Preferably, said at least two first areas are arranged on opposite sides with respect to the perforated seat along a first direction and said at least two second areas are arranged on opposite sides with respect to the perforated seat along a second direction inclined with respect to the first direction.

More preferably, the second direction is substantially perpendicular to the first direction.

Therefore, preferably, in the case of unidirectional fibers the two first areas comprising an amassment of continuous structural fibers are diametrically opposite and spaced apart by about 90° from the two second areas comprising cut structural fibers, whereas in the case of bi-directional fibers four first areas comprising an amassment of continuous structural fibers are provided, spaced apart by about 90° from one another, and four second areas comprising cut structural fibers are provided, spaced apart by about 90° from one another and by about 45° with respect to the four first areas comprising an amassment of continuous structural fibers.

Preferably, the second direction is substantially parallel to a longitudinal direction of the continuous and cut structural fibers in areas far from the perforated seats.

The aforementioned longitudinal direction can be parallel to the circumferential direction of the rim or inclined with respect to the circumferential direction of the rim by a predetermined angle, for example equal to about 45° or 60°. In both cases the presence of structural fibers around the perforated seats results in an advantageous local reinforcing in such regions of the rim, which are particularly critical as to the stresses they are subjected to.

In particularly preferred embodiments, at least two juxtaposed layers of unidirectional structural fibers are provided and the structural fibers of each layer are oriented at about 45° with respect to the circumferential direction of the rim and perpendicular with respect to the structural fibers of an adjacent layer.

Preferably, at least some of the cut structural fibers of at least some of said second areas have, close to the respective perforated seats, a curvilinear progression and, in areas far from the perforated seats, a substantially rectilinear progression.

More preferably, in areas far from the perforated seats the cut structural fibers occupy a space having, along a direction perpendicular to a longitudinal direction thereof, a size greater than 10% of the diameter of the perforated seats.

Even more preferably, the aforementioned size is comprised between 20% and 70% of the diameter of the perforated seats, the extreme values being included.

In particular, if the structural fibers are unidirectional, the aforementioned size is preferably comprised between 20% and 50% of the aforementioned diameter, the extreme values being included, whereas if the structural fibers are bi-directional, the aforementioned size is comprised between 50% and 70% of the aforementioned diameter, the extreme values being included.

In a first preferred embodiment of the rim of the invention, the continuous and cut structural fibers are unidirectional fibers arranged in at least two juxtaposed layers. In this case, preferably, the aforementioned at least one first area and the aforementioned at least one second area are defined in each of said at least two juxtaposed layers.

In a second preferred embodiment of the rim of the invention, said continuous and cut structural fibers are bi-directional fibers and comprise weft fibers and warp fibers. In this case, preferably, the aforementioned at least one first area and the aforementioned at least one second area are defined by both the weft fibers and the warp fibers.

In a second aspect thereof, the present invention relates to a process for manufacturing a bicycle wheel rim, comprising:
- arranging a composite material in a mould comprising a radially inner wall provided with a plurality of first through holes;
- perforating, through a cutting tool, the composite material at said plurality of first through holes making a plurality of second through holes in the composite material;
- after having made said plurality of second through holes, moulding the composite material in the mould forming a respective perforated spoke-attachment seat at each of said second through holes;
- wherein said perforated seat is delimited by at least one first area comprising an amassment of continuous structural fibers and at least one second area circumferentially spaced apart from said first area and comprising structural fibers cut by said cutting tool.

In the present description and in the attached claims:
- "cutting tool" is used to indicate a rotary tool having at least one cutting edge, like for example a drill bit;
- "perforate" is used to indicate a mechanical operation that causes the cutting of continuous structural fibers.

The aforementioned process can be carried out to make a bicycle wheel rim according to the first aspect of the invention. Therefore, such a process has all of the advantages and, preferably, all of the preferred characteristics described above with reference to the rim of the invention.

Preferably, perforating the composite material comprises, at each of said first through holes, inserting the cutting tool in the first through hole along a first direction from a radially inner side of the mould and, subsequently, pushing the cutting tool along said first direction until the respective second through hole is made in the composite material.

Advantageously, the second through holes are made at the first through holes of the mould, and the movement of the cutting tool is guided by the aforementioned first through holes. The first through holes of the mould uniquely define the position and the direction of the perforated seat, making the perforation operation extremely quick and precise.

Preferably, the mould has a substantially annular shape and comprises, on a radially inner surface thereof, a circumferential groove connected to said first through holes.

More preferably, the process according to the invention comprises, after having arranged the composite material in the mould and before perforating the composite material to make each second through hole, inserting the cutting tool in the circumferential groove and moving the cutting tool along the circumferential groove until the respective first through hole is reached.

Advantageously, the cutting tool is comfortably guided between the first through holes through the circumferential groove. Such a provision contributes to make the perforation operation quick and precise.

Preferably, perforating the composite material comprises, after having pushed the cutting tool along said first direction, removing the cutting tool from said second through hole by moving it along a second direction opposite to said first direction.

More preferably, perforating the composite material comprises, after having removed the cutting tool from said second through hole, fine-finishing to size said second through hole through a not-cutting pointed tool inserted in the mould from the opposite side to said first through hole with respect to the composite material.

In the present description and in the attached claims, the term "fine-finishing to size" is used to indicate a mechanical operation that results in the displacement of cut structural fibers and continuous structural fibers until a desired size of the hole is reached in the composite material. Such a hole defines, after moulding the composite material, a nominal design size of the perforated spoke-attachment seat. In the case of pre-impregnated structural fibers, the polymeric material is also displaced by the not-cutting pointed tool.

Preferably, fine-finishing to size said second through hole comprises pushing said not-cutting pointed tool in the second through hole until it is inserted in the respective first through hole.

Advantageously, the first through holes of the mould uniquely define the position and the direction of the perforated seat and, therefore, the aforementioned fine-finishing to size is extremely quick and precise.

Preferably, the not-cutting pointed tool is heated.

Advantageously, such a provision makes it possible to increase the ability and rapidity of displacement of the structural fibers encountered by the pointed tool while it advances in the second hole.

Preferably, the cutting tool comprises a cylindrical cutting portion and a conical cutting tip.

Advantageously, the conical cutting tip makes it possible to precisely start the perforation, whereas the cylindrical cutting portion defines the diameter of the second hole, calibrating it to the desired size.

Preferably, the aforementioned cylindrical cutting portion has a diameter comprised between 20% and 100% of the diameter of the second through holes, more preferably between 20% and 70% of the diameter of the second through holes. The Applicant has observed that also in the case in which the diameter of the cylindrical cutting portion is equal to that of the second through holes a percentage of structural fibers are not cut (uncut) but displaced. Such displacement, caused initially by the conical cutting tip and subsequently by the cylindrical cutting portion, is made possible by the fact that the cutting tool works on a polymeric material that is not yet cross-linked, and thus capable of allowing a displacement of the structural fibers contained therein.

According to a preferred embodiment of the process of the invention, said conical cutting tip is diamond-tipped.

Advantageously, the diamond tip has significant properties as to the cutting reliability and durability.

With reference now to FIG. 1, a bicycle wheel rim according to the present invention is wholly indicated with 50. In the present description and in the attached claims, the terms "inner" and "outer" refer to the radial direction of the rim 50 or, in some contexts, can refer to the direction taken up by a spoke 52. In any case, the aforementioned terms are used to indicate positions respectively proximal and distal with respect to the rotation axis X of the rim 50.

Figure 3:
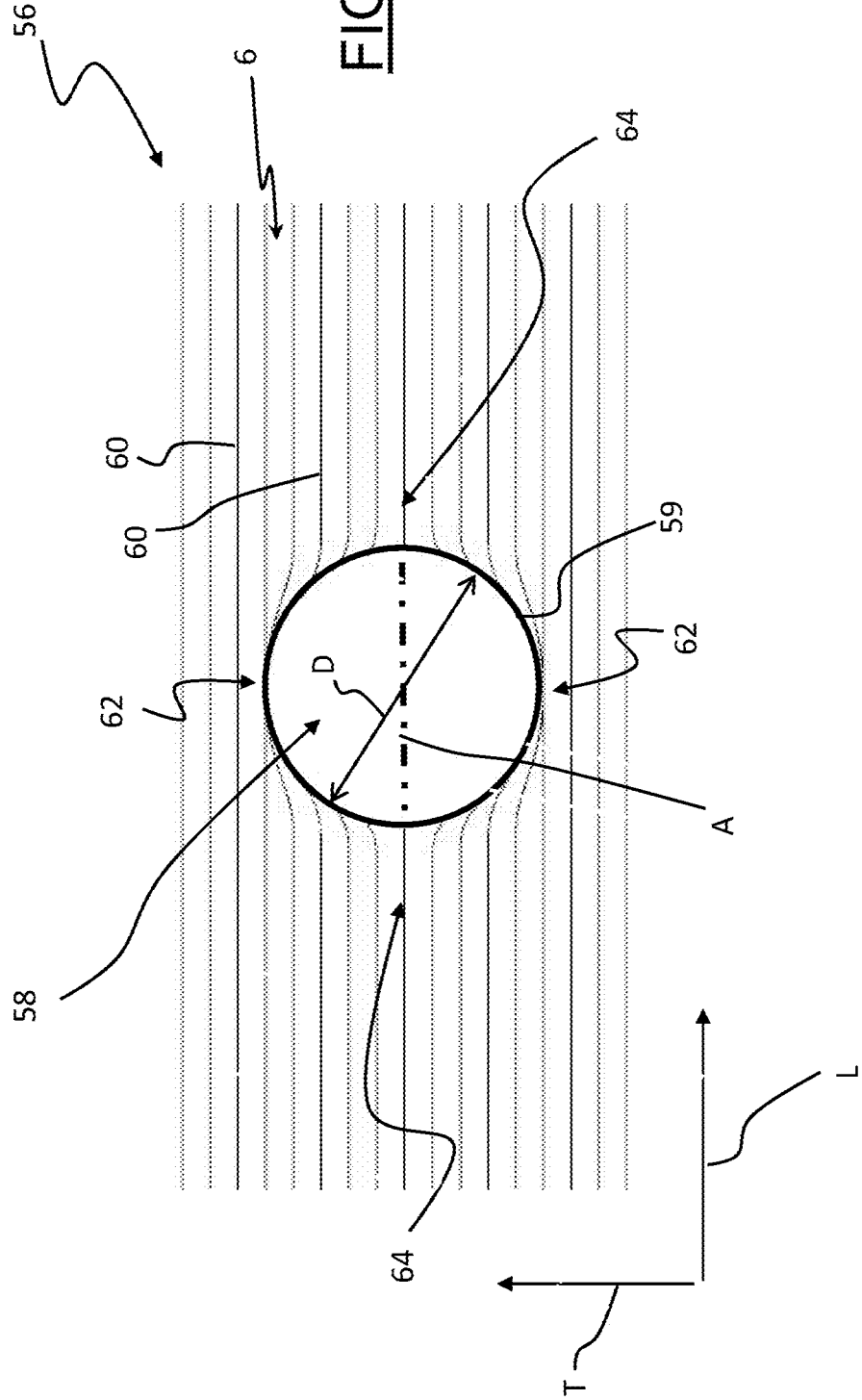
FIG. 3 schematically illustrates a plan view of a portion of the composite material provided in a rim according to the present invention.
Figure 4:
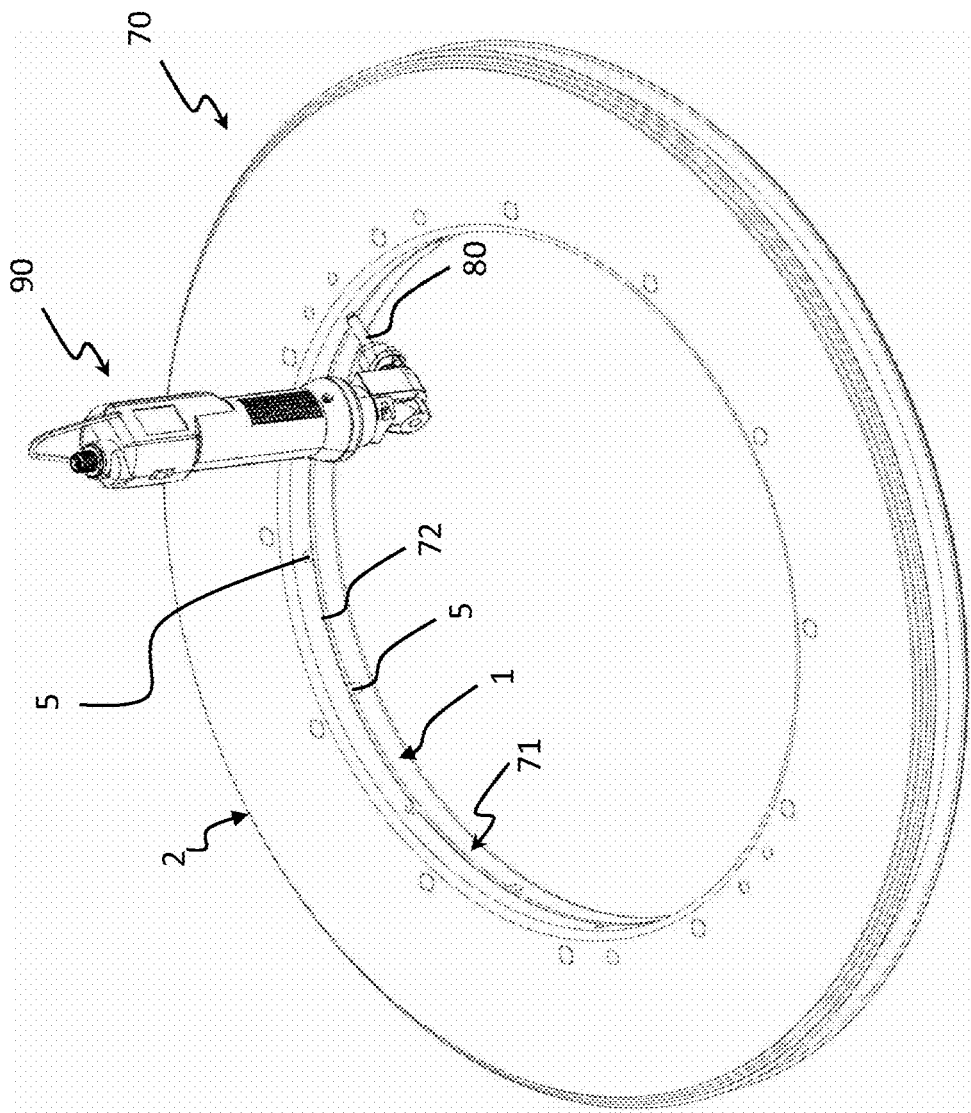
FIG. 4 schematically illustrates a perspective view of a manufacturing step of a bicycle wheel rim according to the process of the present invention.

The rim 50 is made, at least partially, of composite material 6, as shown in FIG. 3.

In the composite material 6, the structural fibers are typically selected from the group consisting of carbon fibers, glass fibers, boron fibers, aramid fibers, ceramic fibers and combinations thereof, carbon fibers being preferred.

The polymeric material of the composite material 6 can be thermoplastic or thermosetting. Preferably, it is a thermosetting resin.

The mechanical characteristics of the composite material 6 change as a function of the type of structural fiber, of the type of weave/pattern thereof, of the type of polymeric material and of the percentage ratio between structural fiber and polymeric material.

In the non-limiting case shown in FIG. 3, the structural fibers of the composite material 6 are unidirectional fibers. FIG. 3 shows in particular a layer of unidirectional structural fibers 60. The structural fibers of the composite material 6 can also be arranged in many juxtaposed layers.

In FIG. 3 the unidirectional structural fibers 60 extend substantially parallel to one another along a longitudinal direction L parallel or inclined with respect to the circumferential direction of the rim 50. Preferably, different juxtaposed layers of unidirectional fibers are provided, arranged so that the directions of the unidirectional fibers of two adjacent layers form angles of opposite direction, and preferably of +45° and −45°, with the circumferential direction of the rim 50.

The rim 50 has a predetermined rotation angle X and is mounted on a bicycle wheel hub 54 through a plurality of spokes 52.

The rim 50 has a radially inner annular wall 56 made of composite material. A plurality of perforated spoke-attachment seats 58, preferably of substantially circular shape and where the spokes 52 are mounted, is made on such an annular wall 56.

In the non-limiting example of FIG. 1, the annular wall 56 has a symmetrical shape with respect to the rotation axis X and to a diametral middle plane perpendicular to the rotation axis X, and the spokes 52 extend along substantially radial directions. However, alternative embodiments are provided in which the annular wall 56 has a non-symmetrical shape and/or where the spokes 52 extend along directions inclined with respect to the radial direction.

Figure 2:
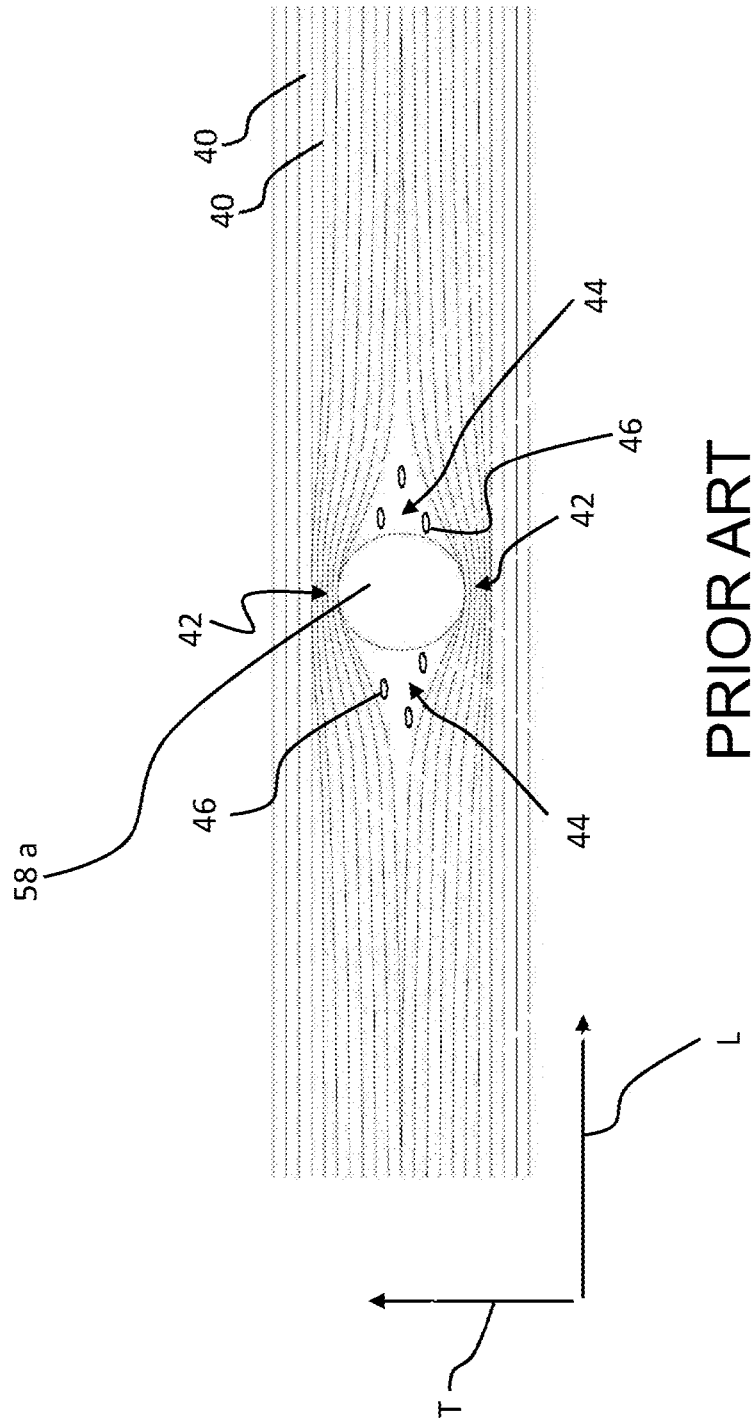
FIG. 2 schematically illustrates a plan view of a portion of the composite material provided in a bicycle wheel rim of the prior art ("PRIOR ART")

FIG. 2 schematically and as an example shows the progression of the unidirectional fibers close to a perforated spoke-attachment seat 58a of a bicycle wheel rim according to a prior art analogous to that of the aforementioned prior art documents. The perforated seat 58a is formed, before moulding the composite material, through displacement of unidirectional structural fibers 40.

In particular, it is noted the presence of two areas 42 comprising an amassment of continuous unidirectional structural fibers 40. The two areas 42 are arranged at diametrically opposite parts with respect to the perforated seat 58a and along a transversal direction T that is substantially perpendicular to the longitudinal direction L of the unidirectional structural fibers 40 in areas far from the perforated seats 58a.

It is also noted the presence, at opposite areas with respect to each perforated seat 58a and spaced apart from the areas 42 comprising an amassment of the fibers 40 by about 90°, of two areas 44 in which only polymeric material is provided and in which there are small areas 46 devoid of polymeric material.

FIG. 3 schematically and as an example shows the progression of the structural fibers close to a perforated seat 58 of the annular wall 56 of the rim 50 according to the present invention.

In the non-limiting example of FIG. 3, the composite material comprises unidirectional structural fibers 60 that, in areas far from the perforated seats 58, extend along a longitudinal direction L. The longitudinal direction L can be parallel to the circumferential direction of the rim 50 or inclined, for example by about 45° or by about 60°, with respect to the circumferential direction of the rim 50.

Each perforated seat 58 has a substantially circumferential shape and is delimited, along the entire perimeter circumference 59 thereof, by two first areas 62 comprising an amassment of unidirectional continuous structural fibers 60 and by two second areas 64 comprising cut unidirectional structural fibers 60. The first and second areas 62, 64 are circumferentially spaced apart from one another.

The two first areas 62 are arranged on opposite sides with respect to the perforated seat 58 along a transversal direction T substantially perpendicular to the longitudinal direction L.

The two second areas 64 are arranged on opposite sides with respect to the perforated seat 58 along the longitudinal direction L.

Therefore, in this non-limiting case of unidirectional structural fibers, the two first areas 62 are diametrically opposite and spaced apart by about 90° from the two second areas 64.

As shown, although schematically, in FIG. 3, some of the unidirectional cut structural fibers 60 of the second areas 64 have, close to the perforated seat 58, a curvilinear progression, whereas in areas far from the perforated seat 58 they have a substantially rectilinear progression parallel to the longitudinal direction L. Close to the perimeter circumference 59 of the perforated seat 58, the unidirectional cut structural fibers 60 tend to open with respect to a diametral plane A of the perforated seat 58 parallel to the longitudinal direction L, that is to take up progressively greater inclinations with respect to the longitudinal direction L as one approaches the first areas 62 and, therefore, the perforated seat 58.

In the areas far from the perforated seat 58, the unidirectional cut structural fibers 60 occupy a space having, along the transversal direction T, a size preferably comprised between 20% and 70% of the nominal diameter D of the perforated seat 58, more preferably between 20% and 50% of the nominal diameter D.

The Applicant has foreseen an alternative embodiment of the rim of the invention, which differs from the one described above with reference to FIG. 3 only in that the structural fibers of the composite material are bi-directional fibers and are arranged in at least two juxtaposed layers to form a fabric comprising weft fibers and warp fibers. In this case, the first areas 62 comprising an amassment of continuous structural fibers and the second areas 64 comprising cut structural fibers are defined by both the weft fibers and the warp fibers.

In particular, each of the perforated seats 58 is delimited by four first areas 62 comprising an amassment of continuous structural fibers, spaced apart by about 90° from one another, and by four second areas 64 comprising cut structural fibers, spaced apart by about 90° from one another and by about 45° with respect to the four first areas 62 comprising an amassment of continuous structural fibers.

Furthermore, in areas far from the aforementioned perforated seats 58, the bi-directional cut structural fibers in such a case occupy a space having, along the transversal direction T, a size preferably comprised between 50% and 70% of the nominal diameter D of the aforementioned perforated seats 58.

With reference to FIGS. 4-7, a preferred embodiment of the process for manufacturing a bicycle wheel rim according to the invention, like for example the rim 50 described above, is described.

The process comprises moulding the composite material in a mould 70.

The mould 70 has a substantially annular shape and comprises two annular elements 1, 2 coupled with one another to define a mould cavity 3.

In the embodiment shown in the attached figures, the mould cavity 3 is shaped to make a symmetrical rim 50, in particular for tubeless tyres.

Figure 5:
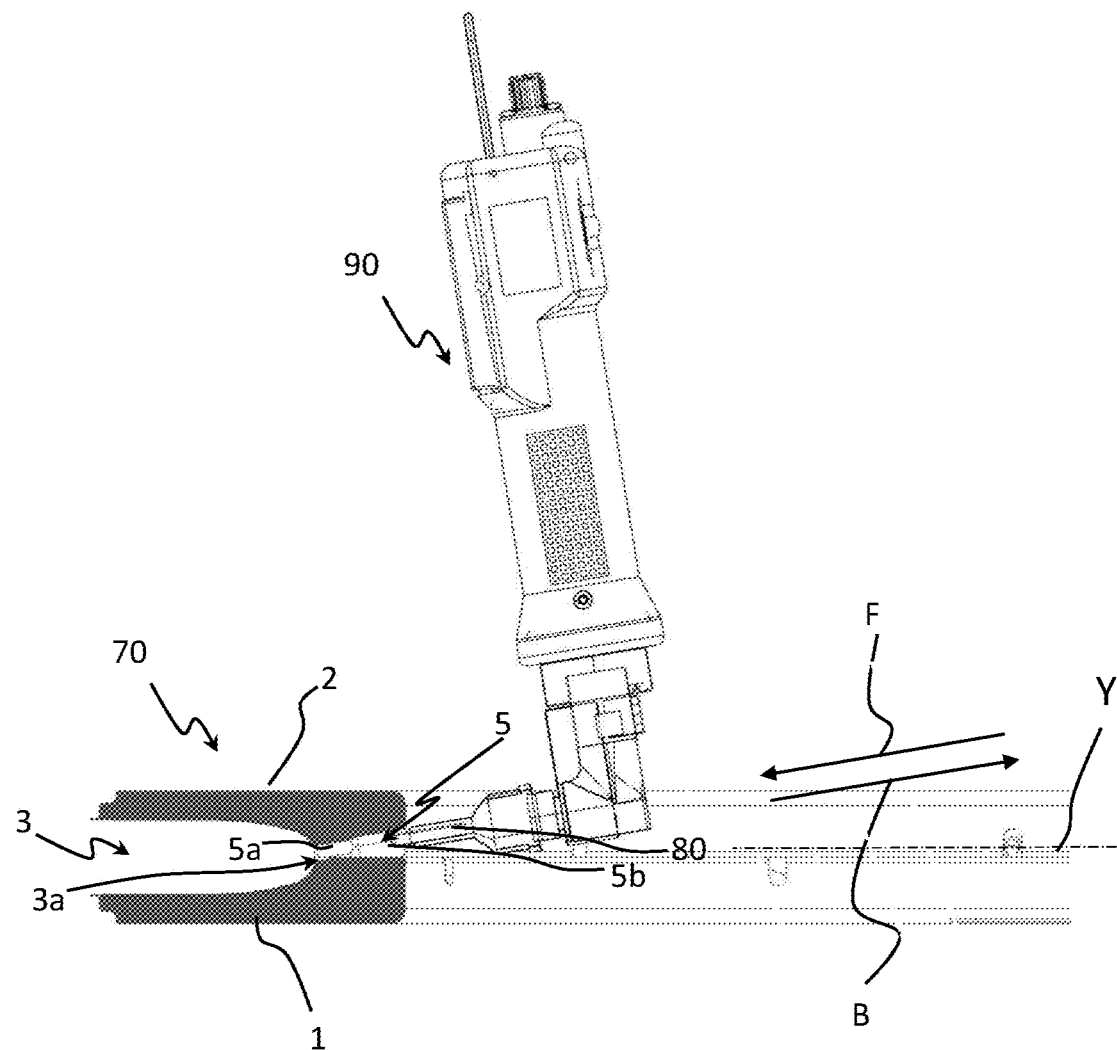
FIG. 5 schematically illustrates a top side view, partially sectioned, of the manufacturing step of FIG. 4.

FIG. 5 shows a half cross-section of the mould 70 carried out at a through hole 5.

The annular elements 1, 2, when coupled, define a plurality of through holes 5 at which the perforated seats 58 will be made.

The mould 70 comprises, on a radially inner surface 71 thereof, a circumferential groove 72 connected to the through holes 5.

In the embodiment shown in the attached figures, the through hole 5 is made in part in the annular element 1 and in part in the annular element 2 and comprises a substantially cylindrical radially outer portion 5a and a radially inner portion 5b having a substantially frusto-conical shape, flared inwards.

The radially outer portion 5a has a diameter substantially equal to the nominal diameter D of the perforated spoke-attachment seats 58, or slightly greater than the nominal diameter D.

The radially outer portion 5a extends according to a direction that corresponds to the direction along which the spoke 52 housed in the perforated seat 58 of the rim 50 will extend.

In the case shown in the attached figures, such a direction extends in the plane of FIG. 5, that is in a transversal plane of the rim 50, along a direction inclined with respect to the diametral middle plane Y of the mould 70. The corresponding spoke 52 is therefore of the type with a radial attachment to the hub 54 with a certain camber. Those skilled in the art will understand that other through holes 5 are provided in suitable positions along the circumferential direction of the annular elements 1, 2, with suitable inclination of the relative radially outer portions 5a depending on the desired camber.

Since in certain spoke patterns the perforated seats 58 in the rim 50 may not be aligned along a single middle plane of the rim 50 and/or the spokes 52 may have a tangential or in any case non-radial attachment to the hub 54, the through holes 5 in the annular elements 1, 2 will have suitable directions and positions and some through holes 5 could also extend in only one of the annular elements 1, 2.

The annular elements 1, 2 preferably have abutment elements (not shown) like for example pins and centering holes, reference marks and similar, to ensure that when they are coupled with each other, the two parts of each through hole 5 in the two annular elements 1, 2 are correctly aligned to overall define the through hole 5 itself.

The process according to the invention initially comprises arranging the composite material 6 in the mould 70, in particular on a radially outer wall 3a of the mould cavity 3.

More in particular, the mould cavity 3 is coated with one or more layers of a sheeted composite material 6, preferably preimpregnated. Such materials are in general known in the field as Sheet Moulding Compounds (SMC) or "prepreg", and substantially comprise structural fibers preimpregnated with polymeric material.

The arrangement of the composite material 6 in the mould cavity 3 can take place by hand or be automated.

Figure 6:
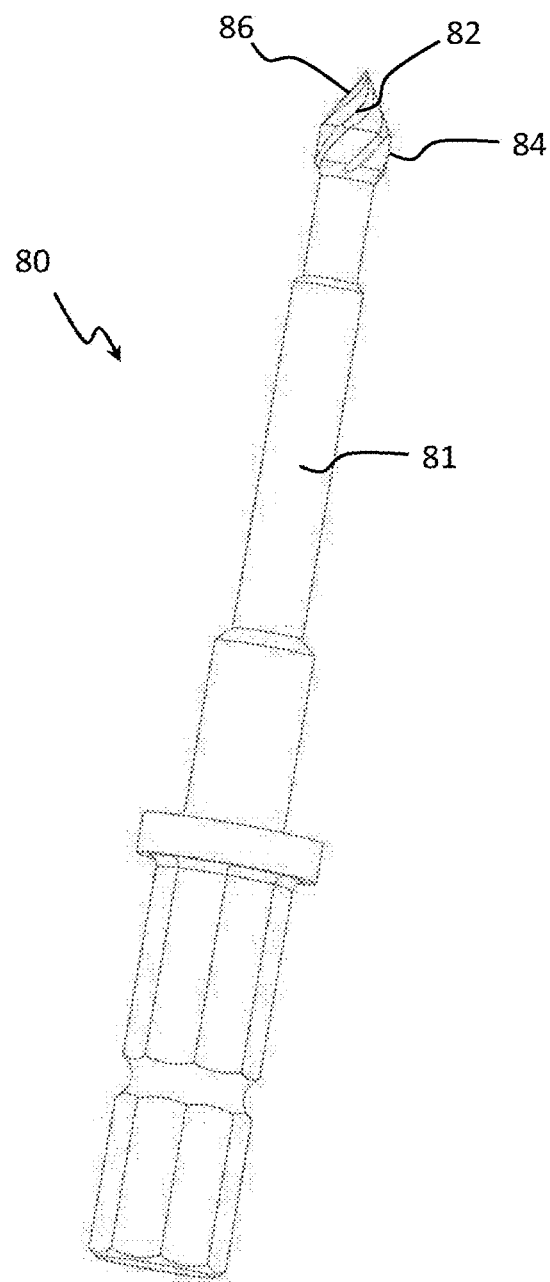
FIG. 6 schematically illustrates a perspective view of a cutting tool used in the manufacturing step of FIG. 4.

The composite material 6 is perforated at the through holes 5 through a cutting tool 80, shown in FIG. 6.

The cutting tool 80 is a rotary tool, mounted on an angled driver 90 (shown in FIGS. 4 and 5), or on a drill. The angled driver 90 has the advantage of being able to be easily maneuvered in narrow spaces, like those inside the mould 70.

In the non-limiting example shown in FIG. 6, the cutting tool 80 comprises a cylindrical shank 81 having, at a free end thereof, a cylindrical cutting portion 84 and a conical cutting tip 86. Both the cylindrical cutting portion 84 and the conical cutting tip 86 have at least one cutting edge 82.

In the specific example illustrated herein, there are more than one cutting edge 82 (for example four) and they extend seamlessly on the cylindrical cutting portion 84 and on the conical cutting tip 86.

Preferably, the conical cutting tip 86 is diamond-tipped.

The perforation of the composite material 6 through the cutting tool 80 produces in the composite material 6 a through hole 6a at each through hole 5 of the mould 70.

The diameter of the cylindrical cutting portion 84 of the cutting tool 80 is selected as a function of the diameter of the through hole 6a to be made, of the desired ratio between cut and continuous (uncut) structural fibers to be obtained at the through hole 6a, as well as based on industrial evaluations (the need to avoid breaking of the cutting tool 80 and the working times).

Preferably, the cylindrical cutting portion 84 has a diameter comprised between 20% and 100% of the diameter of the through holes 6a, more preferably between 20% and 70% of the diameter of the second through holes 6a. During the perforation a part of structural fibers can displace, as it is not yet blocked by the cross-linked polymeric material.

For example, in order to make a through hole 6a having a diameter equal to 5 mm, it is possible to use a cutting tool 80 with a cylindrical cutting portion 84 having a diameter equal to 3.5 mm.

Preferably, the cutting tool 80 is used at room temperature, i.e. before being used it is not heated, so as to avoid portions of sheared structural fiber remaining stuck on the surface thereof, which would worsen the quality and the dimensional precision of the through holes 6a.

The perforation of the composite material 6 to make the through holes 6a initially comprises inserting the conical cutting tip 86 in the circumferential groove 72 and subsequently moving the cutting tool 80 along the circumferential groove 72 until each through hole 5 is reached.

Once a through hole 5 is reached, the cutting tool 80 is inserted into it along a first direction F, starting from the radially inner portion 5b thereof. The substantially frusto-conical and inwardly-flared shape of the radially inner portion 5b makes easier and guides the insertion of the cutting tool 80.

Thereafter, the cutting tool 80 reaches the substantially cylindrical radially outer portion 5a of the through hole 5 and is pushed until the composite material 6 is reached and perforated, thus making the through hole 6a in the composite material 6.

The cutting tool 80 is then removed from the through hole 5, moving it along a direction B opposite to the insertion direction F.

The conical tip 86 of the cutting tool 80 is thus moved along the circumferential groove 72 and crosses it until the next through hole 5 is reached, where it carries out the perforation of the composite material 6 in the same way as described above.

Figure 7:
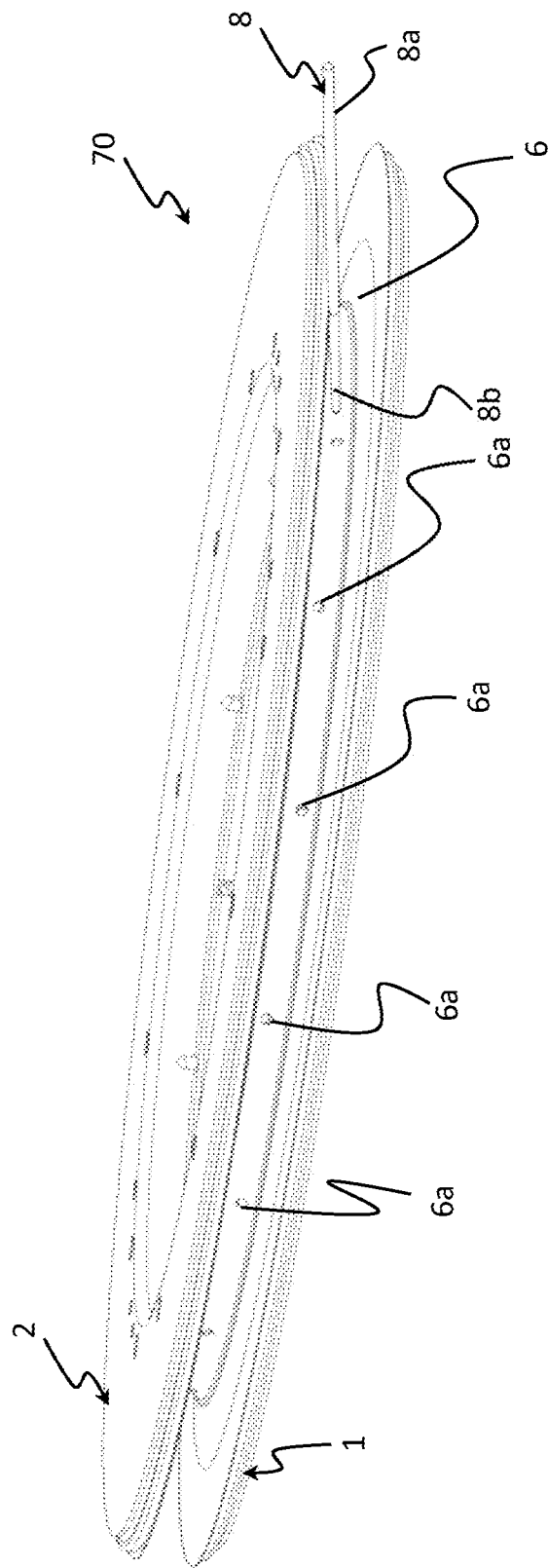
FIG. 7 schematically illustrates a perspective view of another manufacturing step of a bicycle wheel rim according to the process of the present invention.

After the cutting tool 80 is removed from the through hole 6a, the latter is fine-finished to size through a not-cutting pointed tool 8, such as an awl, as shown in FIG. 7.

The pointed tool 8 is inserted in the through hole 6a from the mould cavity 3, thus from the radially outer side of the mould 70.

The pointed tool 8 crosses the composite material 6 and partially inserts in the radially outer portion 5a of the through hole 5 of the annular elements 1, 2 of mould 70.

The pointed tool 8 has a cylindrical shank 8a having a predetermined diameter and a tip 8b or a tapered part ending substantially with a tip.

The predetermined diameter of the cylindrical shank 8a substantially corresponds to the nominal diameter D of the perforated spoke-attachment seats 58 to be obtained in the rim 50, or is slightly greater than such a nominal diameter D, and is also substantially equal to or slightly lower than the diameter of the substantially cylindrical radially outer portion 5a of the through hole 5.

The insertion depth of the tool 8 is selected so that, in addition to the tip 8b, also a part of the cylindrical shank 8a is inserted in the radially outer portion 5a of the hole 5. The through holes 6a therefore take on a nominal diameter substantially equal to the predetermined diameter of the cylindrical shank 8a.

In practice, through the insertion of the pointed tool 8 in the through hole 6a of the composite material 6, a displacement of the continuous structural fibers and of the cut structural fibers that result from the previous perforation of the through hole 6a is actuated. The displacement of the aforementioned continuous and cut structural fibers is such that a desired size of the through hole 6a is reached, which defines, after the subsequent moulding of the composite material 6, a nominal design size of the perforated spoke-attachment seat 58. Typically, the diameter of the through hole 6a after the step of fine-finishing to size with the pointed tool 8 is greater than the diameter of the through hole 6a after the step of perforating with the cutting tool 80.

In the insertion step of the pointed tool 8, it follows the inclination of the radially outer portion 5a of the through hole 5 in the inner elements 1, 2 of mould 70, which acts as guide of the pointed tool 8.

The aforementioned step of fine-finishing to size described above can be carried out after having heated the pointed tool 8. During the insertion in the composite material 6, the hot tip 8b decreases the viscosity of the polymeric material, promoting the displacement of the structural fibers therein. Of course, if the polymeric material of the composite material 6 is of the thermosetting type, the temperature of the pointed tool 8 must be lower than the cross-linking temperature thereof. The heating must also take place at a temperature such as to avoid the polymeric material to drip into the through hole 5. Merely as an example, the heating temperature can be 30-40° C.

The pointed tool 8 is then extracted in the opposite direction.

Thus, the moulding of the composite material 6 in the mould 70 proceeds, forming the respective perforated spoke-attachment seat 58 at each of the second through holes 6a.

During the moulding step the cross-linking of the thermosetting or thermoplastic polymeric material takes place, which locks the structural fibers in position.

Of course, those skilled in the art, in order to satisfy specific and contingent requirements, can bring numerous changes and variants to the present invention, all of which are in any case within the scope of protection defined by the following claims. The following should therefore only be taken as an example.

Instead of using pre-impregnated composite material, a material in dry fiber can be used during the initial steps of the process, so that in particular the perforation step can take place on only the material in dry fiber. The polymeric material is subsequently injected, preferably in several points, to incorporate the material in dry fiber, before the application of the temperature and pressure profile necessary for the hardening of the composite material.

The process can comprise the step of coupling inserts provided with respective through holes at the perforated seats, preferably before the aforementioned step of moulding. The inserts are thus preferably co-moulded in the perforated seats. The inserts increase the resistance of the rim to the traction stresses imparted by the spokes of the wheel; moreover, the co-moulding of the insert with the composite material prevents a wearing by friction due to the sliding of the insert on the composite material.

Moreover, the process can comprise the step of temporarily sealing the perforated seats during the aforementioned step of moulding, for example with an auxiliary element analogous to the one described in EP 2422959. The temporary sealing of the perforated seats during the moulding step can in any case also be omitted, possibly by providing a cleaning step after moulding.

The process of the invention can comprise the step of co-moulding an outer rim component, made of metallic or composite material, with the aforementioned part of rim made of composite material.

The process described above can also be applied only to some of the perforated spoke-attachment seats, making other spoke-attachment seats in the rim with conventional technology.

The bicycle wheel rim made according to the invention adapts particularly well to tubeless wheels.

However, it should be understood that the invention applies, in the various aspects thereof, also to rims for wheels with air chamber and for wheels with tubular tyres (clincher).

What is claimed is:

1. A bicycle wheel rim, comprising a wall made of composite material having a plurality of perforated spoke-attachment seats, wherein, in a single layer of unidirectional fibers, each perforated seat is delimited, at a perimeter circumference thereof, by at least one first area on the single layer comprising an amassment of continuous structural fibers and at least one second area on the single layer circumferentially spaced apart from said first area and comprising cut structural fibers, wherein the continuous structural fibers and the cut structural fibers occupy an entirety of the perimeter circumference of each perforated seat.

2. The rim according to claim 1, wherein each perforated seat is delimited by at least two first areas comprising an amassment of continuous structural fibers and by at least two second areas circumferentially spaced apart from said at least two first areas and comprising cut structural fibers.

3. The rim according to claim 2, wherein said at least two first areas are arranged on opposite sides with respect to the perforated seat along a first direction (T) and said at least two second areas are arranged on opposite sides with respect to the perforated seat along a second direction (L) inclined with respect to the first direction (T).

4. The rim according to claim 3, wherein the second direction (L) is substantially perpendicular to the first direction (T).

5. The rim according to claim 4, wherein the second direction (L) is substantially parallel to a longitudinal direction of the continuous and cut structural fibers in areas far from the perforated seats.

6. The rim according to claim 1, wherein at least some of the cut structural fibers of at least some of said second areas have, close to the respective perforated seats, a curvilinear progression and, in areas far from the perforated seats, a substantially rectilinear progression.

7. The rim according to claim 1, wherein in areas far from the perforated seats cut structural fibers occupy a space having, along a direction (T) perpendicular to a longitudinal direction (L) thereof, a size greater than 10% of the diameter (D) of the perforated seats.

8. The rim according to claim 7, wherein said size is comprised between 20% and 70% of the diameter (D) of the perforated seats, the extreme values being included.

9. A rim according to claim 1, wherein:
said continuous and cut structural fibers are unidirectional fibers arranged in at least two juxtaposed layers, said at least one first area and said at least one second area being defined in each of said at least two juxtaposed layers; or
said continuous and cut structural fibers are bi-directional fibers and comprise warp fibers and weft fibers, said at least one first area and said at least one second area being defined by both the warp fibers and the weft fibers.

10. A bicycle wheel rim, comprising a wall made of composite material having a plurality of perforated spoke-attachment seats, wherein each perforated seat is adjacent to delimited by at least one first area comprising an amassment of continuous structural fibers and at least one second area circumferentially spaced apart from said first area and comprising cut structural fibers, wherein in areas far from the perforated seats the cut structural fibers occupy a space having, along a direction (T) perpendicular to a longitudinal direction (L) thereof, a size greater than 10% of the diameter (D) of each perforated seat.

11. The rim according to claim 10, wherein said size is comprised between 20% and 70% of the diameter (D) of each perforated seat, the extreme values being included.

12. The rim according to claim 11, wherein the structural fibers are unidirectional and said size is comprised between 20% and 50% of the diameter of each perforated seat, the extreme values being included.

13. The rim according to claim 11, wherein the structural fibers are bi-directional and said size is comprised between 50% and 70% of the diameter of each perforated seat, the extreme values being included.

* * * * *